No. 663,592. Patented Dec. 11, 1900.
R. T. WEAVER.
FILTER.
(Application filed May 31, 1900.)
(No Model.) 6 Sheets—Sheet 1.

WITNESSES:

INVENTOR

BY
ATTORNEY

No. 663,592. Patented Dec. 11, 1900.
R. T. WEAVER.
FILTER.
(Application filed May 31, 1900.)

(No Model.) 6 Sheets—Sheet 4.

No. 663,592. Patented Dec. 11, 1900.
R. T. WEAVER.
FILTER.
(Application filed May 31, 1900.)
(No Model.) 6 Sheets—Sheet 5.

Witnesses,
F. M. Dornbach
Wm. L. Clark

Robert T. Weaver
Inventor,
by Henry P. Wells
his Atty.

No. 663,592. Patented Dec. 11, 1900.
R. T. WEAVER.
FILTER.
(Application filed May 31, 1900.)
(No Model.) 6 Sheets—Sheet 6.

Witnesses,
J. M. Drusbach
Wm L. Clark

Inventor,
Robert T. Weaver by
Harry P. Wells
his atty

UNITED STATES PATENT OFFICE.

ROBERT T. WEAVER, OF NEW YORK, N. Y.

FILTER.

SPECIFICATION forming part of Letters Patent No. 663,592, dated December 11, 1900.

Application filed May 31, 1900. Serial No. 18,550. (No model.)

*To all whom it may concern:*

Be it known that I, ROBERT T. WEAVER, a citizen of the United States, and a resident of New York city, in the county of New York and State of New York, have invented certain new and useful Improvements in Filters, of which the following is a specification.

This invention relates to filtration of water on a large scale, as for private houses, hotels, factories, and municipal purposes.

It comprises a novel organization wherein the flow of water may be reversed, the filter-bed broken up, disintegrated, or agitated for the purpose of cleaning, and wherein two horizontal filter-beds may be contained in one apparatus. Water to be filtered may pass from a single valve in parallel currents through the two beds independently and be discharged through a single filtered-water outlet or by a slight change in the valve be passed through the two beds in series. The construction and mode of operation appear in detail from the following description.

The form in which the invention is shown as embodied in the drawings is a practical and efficient one and is the best now known to me. Changes may, however, be made by those skilled in the art without departing from the principles of construction or the general mode of operation.

I employ a rectangular box or holder in which the two filter-beds are contained and a single valve serving as an induction and eduction valve for both filter-beds. The box is mounted to be at will rotated partly or wholly, and means are provided for then breaking up the filter-beds and freeing them from the matter deposited on and in their surfaces.

It will be apparent after a perusal of this specification that there are some features of the invention that may be used with a single filter-bed and that the general principles of organization and mode of operation lend themselves to the effective use of multiple filter-beds comprised in a single apparatus. I use a square or rectangular box because I obtain a maximum area of surface and can readily arrange within it multiple horizontal filter-beds which may be of equal superficial area and also of equal thickness, if so desired.

In the accompanying drawings, Fig. 11, a similar section on the line 11 11 of Figs. 8 and 13; Fig. 12, a similar section on the line 12 12 of Figs. 8 and 13; Fig. 13, a vertical longitudinal section through the valve, showing a modified construction, whereby water that has passed through the upper filter-bed is then passed through the lower one; Fig. 14, a detail sectional view, on an enlarged scale, showing the construction of screens for confining the filtering material in the filtering-compartments.

In the organization disclosed in the drawings B is an oblong box rectangular in cross-section and mounted, as hereinafter described, to be rotatable about its longitudinal axis. It is divided horizontally by a partition B', Figs. 2 and 4, into two rectangular chambers of equal or similar dimensions, each of which is divided into four compartments by transverse vertical partitions B². Each such compartment may be said to be divided into ten subcompartments, Figs. 2, 3, and 4, by suitable means, which may consist of two series or sets of bars B³, riveted or otherwise attached to the side walls of the compartment at suitable distances from the partition B' and the opposite or outer wall and also to four posts B⁴ X-shaped in transverse section, which are of less length than the depth of the compartment and are sustained by the two series of bars B³, so that there shall be a suitable space between their inner ends and the partition B' and their outer ends and the opposite or outer wall of the compartment. Across each compartment opposite the inner and outer ends, respectively, of the posts B⁴ is a screen O O', the details of construction of which are hereinafter described. In each of the upper series of compartments (having reference to the position of the apparatus shown in Fig. 2) between the screen O' and the outer wall is arranged a series of horizontal perforated pipes $a$, closed at their outer ends, and at their adjacent inner ends connected together and to a pipe $a'$ on the outside of the box, communicating with a chamber $a^2$ in the casing V of a water-valve W, the casing being attached to the box and rotatable with it. A similar series of perforated pipes $d$ is arranged in each of the lower series of compartments between the screen O' and the outer wall of the box and connected to the pipe $d'$ on the outside of the box, which communicates with an opening $d^2$ in the valve-casing V. Like series of perforated pipes $b$ are also arranged between the partition B' and the screens O of the upper series of compartments and are connected by pipe $b'$ with the port $b^2$ in the valve-casing V, while a like series of perforated pipes $c$ are arranged between the partition B' and the screens O of the lower compartments and are connected by pipe $c'$ with the port $c^2$ in the valve-casing V.

Granulated filtering material (indicated by Y in Fig. 4) is placed in the various compartments formed by the partitions B² to about the depth indicated. It should not, by preference, fill the compartments.

Figure 2:
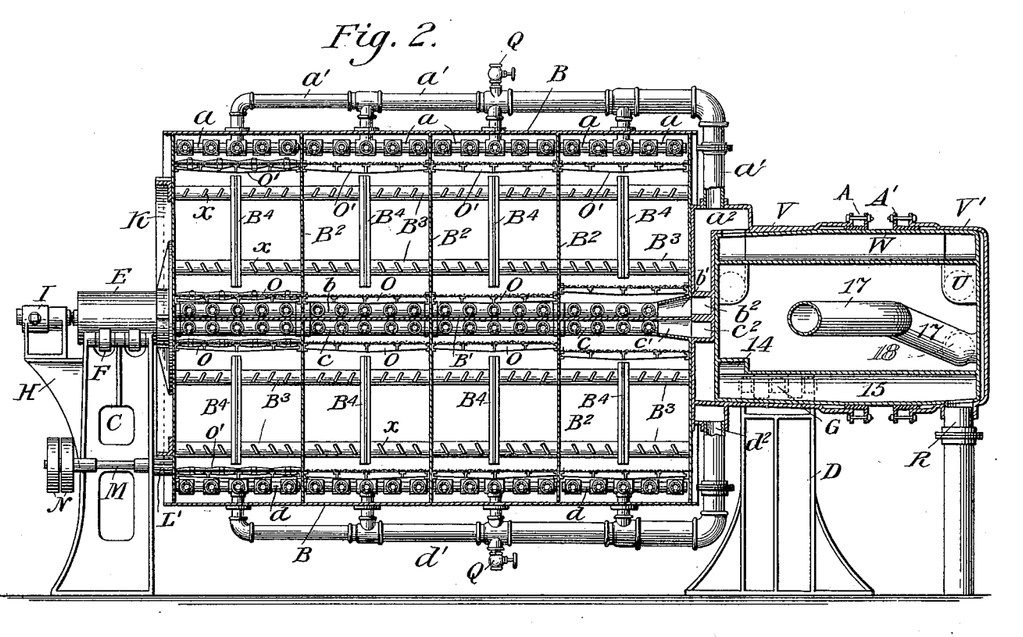
Fig. 2, a longitudinal vertical section on the line 2 2 of Fig. 6.
Figures 3, 7:
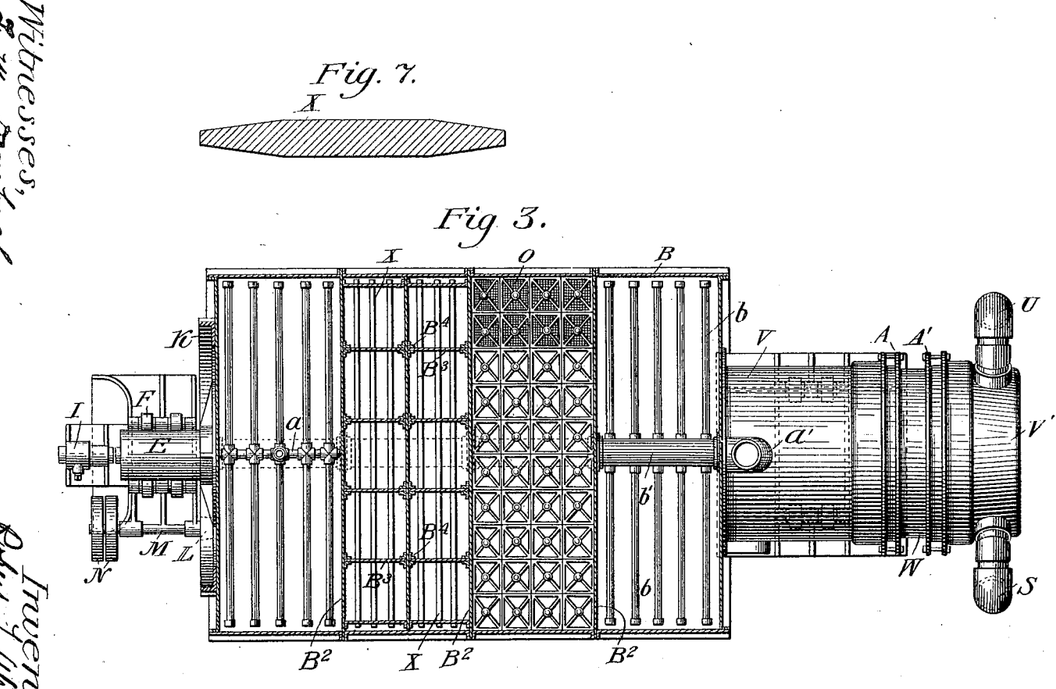
Fig. 3, a horizontal section on the line 3 3 of Fig. 1; Fig. 4, a transverse section on the line 4 4 of Fig. 1.
Fig. 7, a detail cross-section, on an enlarged scale, of one of the breakers or knives for disintegrating the filtering material.
Figure 4:
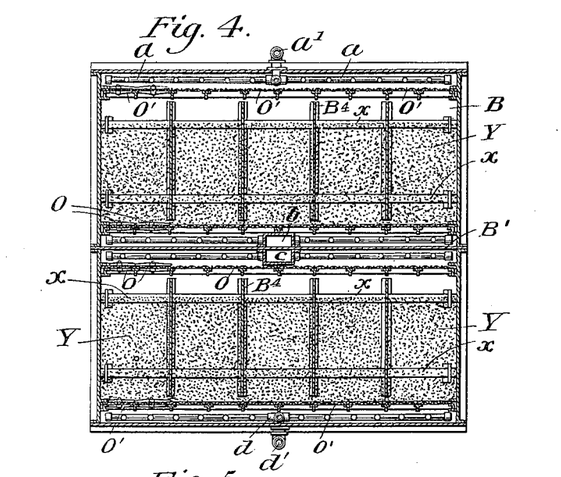
Figure 5:
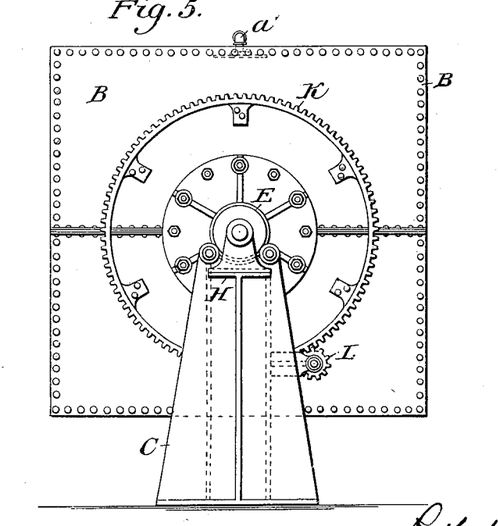
Fig. 5, an end elevation.

Breakers or disintegrating-knives X, preferably of the cross-section shown in Fig. 7, are mounted at an angle, as seen in Fig. 2, in slots or openings in the two series of bars B³ and extend quite across the compartments transversely and horizontally. These knives and the bars in which they are mounted serve to stir, agitate, or break up the filtering material when the box is rotated or rocked upon its bearings.

The valve-casing V is tapered internally and embraces the correspondingly-tapered end of the valve W, a stuffing box or gland A being applied between the end of the casing and the valve. The reversely-tapered outer end of the valve is embraced by a correspondingly-tapered end casing V', and a stuffing-gland A' is applied between it and the valve. To the outer casing V' are rigidly attached the unfiltered-water-supply pipe U, the filtered-water-discharge pipe R, and the waste-water or sewer pipe S. The casing V rests upon bearing-rollers G in the standard D, while at the opposite end of the box is secured a trunnion E, supported by similar bearing-rollers F, mounted in the standard C, to which is secured a bracket H, carrying a hydraulic cylinder I, whose piston bears axially against the trunnion E and holds the valve W and its casings V V' in close contact, the end thrust being resisted by the pipes U R S. On the end of the box around the trunnion E is a gear-ring K, with which gears a pinion L on a shaft M, having at its outer end a belt-pulley or other suitable means for applying power for the rotation of the box.

Attached to the valve W, between the glands A A', is a handle W', by which the valve may be partially rotated when required.

Figure 6:
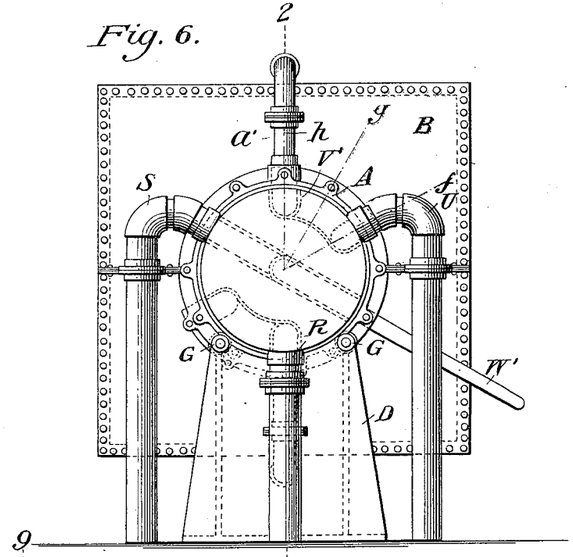
Fig. 6, an elevation of the valve end of the apparatus.
Figures 8, 10:
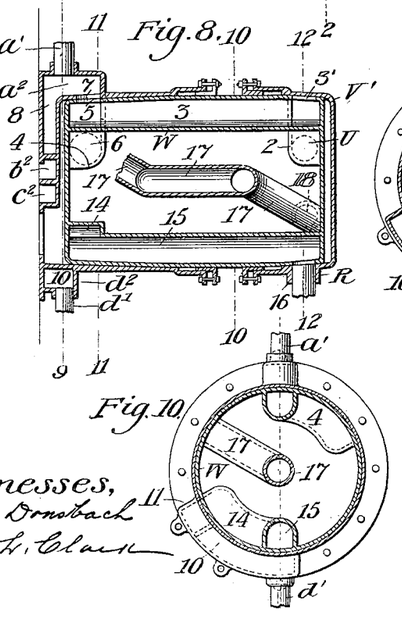
Fig. 8, a vertical longitudinal section through the valve.
Fig. 10, a similar section on the line 10 10 of Figs. 8 and 13.
Figure 9:
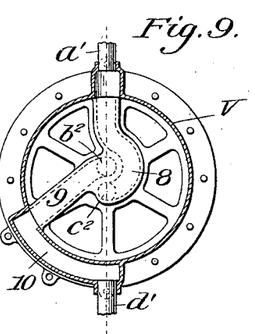
Fig. 9, a transverse section on the line 9 9 of Fig. 8.

The construction and mode of operation of the valve are as follows, though valves of different mechanical form may be devised by those skilled in the art to perform like functions: The valve W has a port 1 in its side which when the parts are in the normal position shown in the drawings is opposite the end of the unfiltered-water-supply pipe U, Fig. 12, and opens to one end of a segmental passage 2, the opposite end of which is open to a longitudinal passage 3, extending to the box end of the valve and there opening into a segmental passage 4, having ports 5 6 near its opposite ends, the former of which is (in the position shown) then opposite a port 7, opening into the chamber $a^2$ of the casing V, and from such chamber extends a curved transverse passage 8, Figs. 8 and 9, to the port $c^2$. Thus water entering from pipe U will pass to the pipe $a'$ and the pipe $c'$ and be distributed through the perforated pipes $a$ $c$ upon the screens O' and O and the upper surface of the filtering material Y in each compartment of the upper and lower series of compartments, and after passage through the filtering material will enter the pipes $b$ $b'$ and $d$ $d'$. The port $b^2$ in the casing V, with which the pipe $b'$ connects, is open to a radial passage 9, Figs. 8 and 9, communicating with a segmental passage 10, into which opens the pipe $d'$. From the passage 10 there extends toward the outer end of the valve a chamber 11, having in it a port 12, Figs. 10, 11, and 12, opening (in the position shown) into a port 13 at one end of a segmental passage 14 in the valve W, and the opposite end of which passage communicates with a longitudinal passage 15, in the outer end of which is a port 16, opening to the pipe R, to which the filtered water from the upper and lower series of compartments, respectively, is thus delivered. In the interior of the valve is an irregularly-shaped passage or pipe 17, one end of which is connected to a port 18 in the side of the valve, in line with and equidistant between the ports 1 and 16, Figs. 2, 8, and 12, and which in the normal position is closed by the wall of the casing V'. The opposite end is open to a port 19 at the box end of the valve, in line with and midway between the ports 5 and 13, but normally closed by the wall of the casing V, Figs. 11 and 12. If the valve by means of the handle W' or otherwise be moved from the normal position through the arc $f$ $g$, Fig. 6, it is obvious that the various ports of the valve will be closed and ingress of water to the box and egress therefrom arrested. If, however, the movement be continued through the arc $g$ $h$, the flow of the currents through the box will be reversed. Thus the inlet-pipe U will then be in communication with the port 18 and pipe or passage 17, the opposite end of which will then be in communication with the port 12, open to the passage or chamber 10, and unfiltered water will pass to the pipes $d'$ $d$ and $b'$ $b$, respectively, at the bottoms of the filter-compartments. The filtered-water pipe R is closed. The port 3', (not before mentioned,) Fig. 12, at the outer end of the passage 3 will have passed into communication with the sewer or waste pipe S, while the port 6 will be opposite the port 7, opening to the chamber $a^2$ in the casing V. Water leaving the tops of the compartments by the pipes $c$ $c'$ and $a$ $a'$ will now be delivered to the chamber $a^2$ and thence to the discharge or waste pipe S. A feature of the construction of this valve is that the filtered-water passages 14 and 15 and pipe R are never in direct communication with the pipes U and S. When the filter-beds are foul or their efficiency decreased by the superficial deposit of matter thereon, the flow of water may be reversed to clean them. The reversal or rotation of the box and the consequent disintegration of the granular filter-beds assists the cleaning operation. Preferably I should proceed as follows: When the beds require cleaning, the flow of water is first reversed for a suitable time and much, if not the greater part, of the deposit on and in the surface of the beds will be carried off and discharged through the pipe S. The valve may then be set in the middle position, in which the various ports are closed and pressure in the hydraulic cylinder cut off to permit the ready turning of the box. The reduction of pressure in the cylinder may be the first step in the operation should there be difficulty in turning the valve, and it may then be restored to maintain tight valve-joints while the reversed flow of the water is occurring. When the valve is in the middle position, the box may be reversed one or any desired number of times. The filtering material, falling through the water-filled spaces of the compartments, will be thoroughly broken up by the knives X and bars $B^3$ and the extraneous matter to be eliminated will be washed out by the water and held in suspension in it at the tops of the compartments when the box is brought to rest. The reversed flow of water is then continued and all impurities carried off, after which normal conditions may be established and pure or filtered water delivered, as before, to the pipe R.

The knives X are preferably doubly beveled on each edge, Fig. 7, as they appear when so shaped to act more efficiently. They may, however, be of any cross-section.

Figures 11, 12, 13, 14:
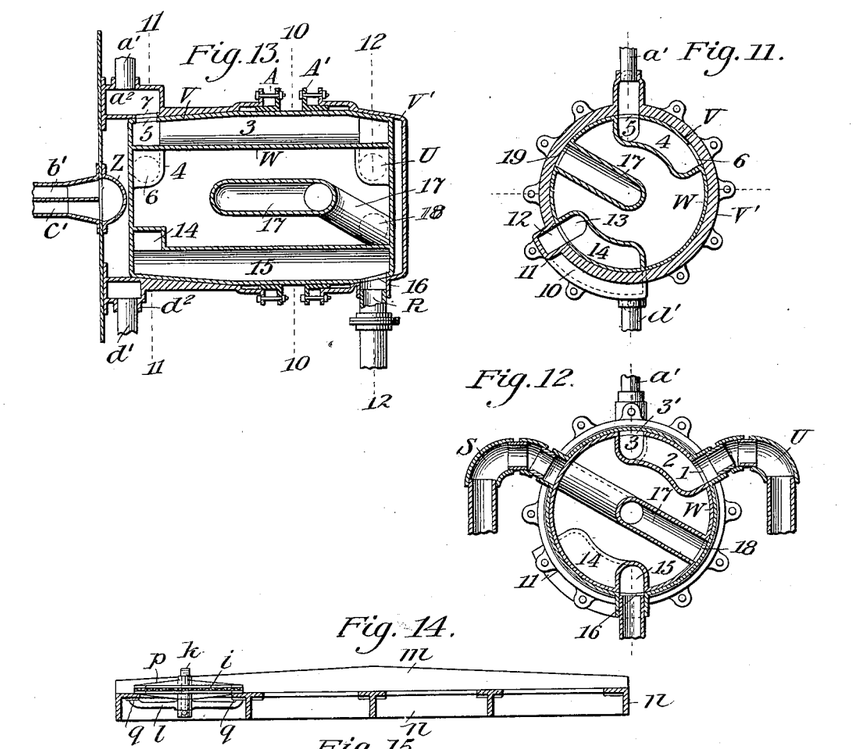
Figure 15:
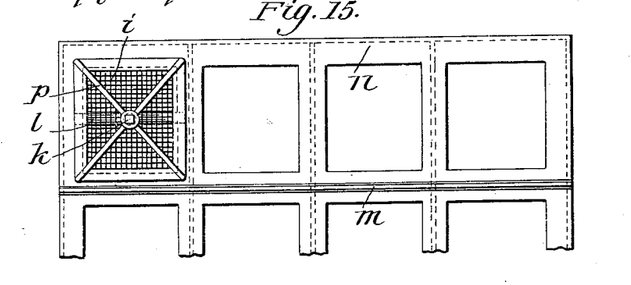
Fig. 15, a plan view of same.

The screens O O' may of course be constructed and mounted in any appropriate manner. The special construction shown is as follows: Figs. 14 and 15 show on an enlarged scale the screen for either the top or bottom of one compartment. It consists of a rectangular frame having eight rectangular openings in two rows of four each. On the under face of the frame around the edge and between openings are flanges $n$, and on the upper face between the two rows of openings is a strengthening-rib $m$. At each opening is applied a perforated plate or piece of woven-wire cloth $i$, clamped in position by an upper rectangular spider-frame $p$, having a central threaded hub in which works a screw-bolt $k$, the lower end of which turns loosely in a cross piece or clamp $l$, applied to the under face of the opening and is prevented from rising by a key or pin passing through it below the clamp $l$. By rotating the bolt the cloth or perforated plate $i$ is firmly clamped at its edges over the opening. I prefer to make a number of such small openings and apply a screen at each, as the structure is strong and may be readily assembled and repaired. The outer flange $n$ may be riveted or otherwise attached to the partitions $B^2$ and the side walls of the box.

The pipe 17 in the valve is shown as composed of a central portion axially located in the valve and an inclined part at each end thereof extending to the wall of the valve near its respective ends. Any other shape of pipe or character of passage connecting the ports 18 19 might be used.

Figure 1:
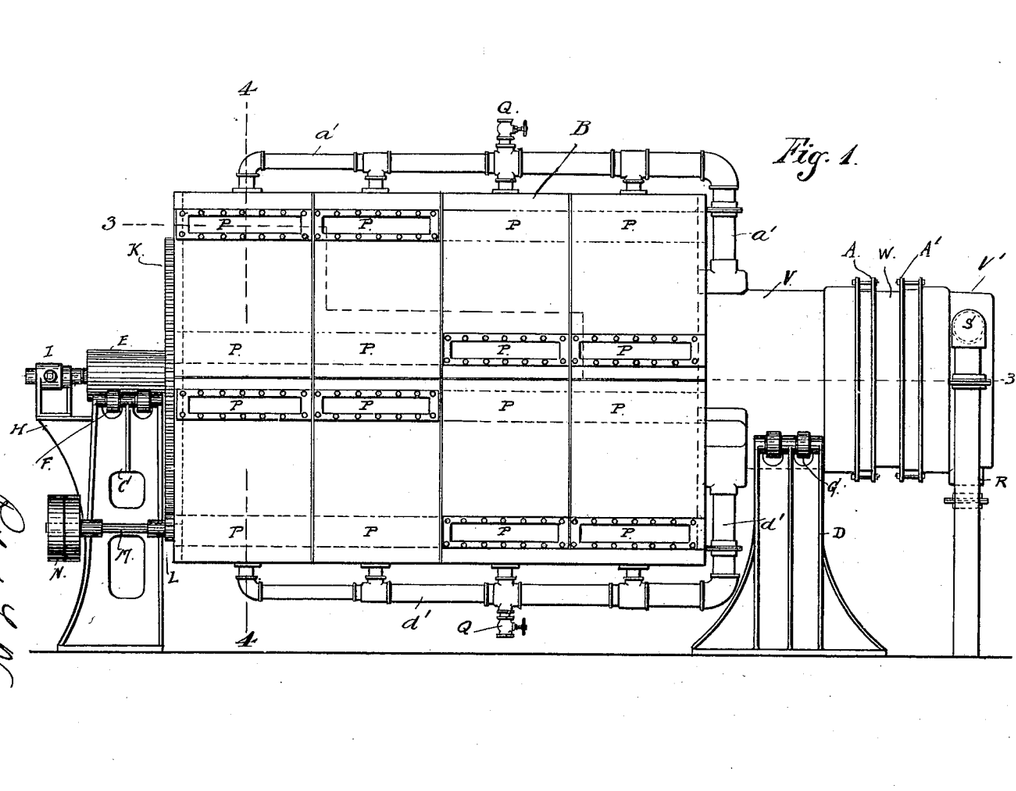
Figure 1 is a side elevation.

Manholes P, Fig. 1, are provided upon the sides of the box opposite the upper and lower sides of the compartments.

The filter as thus far described is arranged for single filtration, the currents of water being in parallel and each filter-bed acting independently. By modifying the valve, as shown in Fig. 13, the filtration may be double—that is, in series—first through the upper bed and then the lower one. The only change required in the valve is to eliminate the passages 8 and 9 of Figs. 8 and 9 and directly connect the two pipes $b'$ $c'$, which may be done by placing a cap Z, Fig. 13, over them.

This filter may be built of any suitable materials. The drawings indicate that the box-partitions, &c., may be of sheet metal. The valve and casings may be of cast metal. Reference to other parts seems quite unnecessary.

The division of each filter-bed into sections occupying different compartments and the bars and breakers or knives in each compartment prevent the shifting of the filtering material laterally and maintain a substantially uniform thickness and a flat or horizontal surface upon which the water is evenly distributed by the perforated pipes.

Cocks or valves Q are provided on the pipes $a'$ $d'$, by means of which the water in the box may be discharged, the valve being then in the middle position.

It is apparent that in the normal operation of the filter it is quite immaterial which side of the box is uppermost.

I claim as my invention—

1. The combination of two horizontal filter-beds arranged one above the other and mounted to be rotated or partially rotated at will, water-pipes located at the top and bottom, respectively, of the two beds, an independently-rotatable induction and eduction valve with which said pipes communicate having ports and passages whereby when in one position water is circulated through the beds in one direction and in another position the circulation is reversed.

2. The combination of two horizontal filter-beds arranged one above the other and mounted to be rotated or partially rotated at will, water-pipes located at the top and bottom, respectively, of the two beds, an induction and eduction rotatable valve with which said pipes communicate having ports and passages whereby when in one position water is circulated through the beds in one direction, in another position the circulation is reversed, and in a third position the induction and eduction ports or openings are closed.

3. The combination of two horizontal filter-beds arranged one above the other and mounted to be rotated or partially rotated at will, water-pipes located at the top and bottom, respectively, of the two beds, valve mechanism with which said pipes communicate, an unfiltered-water-supply pipe, a filtered-water-discharge pipe and a waste-pipe connected with the valve mechanism, such mechanism having ports and passages whereby when in one position the waste-pipe is closed, unfiltered water admitted to the beds and filtered water withdrawn therefrom, in a second position ingress and egress of water cut off, and in a third position the direction of circulation of the water through the beds reversed, water from the beds directed to the waste-pipe, and the filtered-water-discharge pipe closed.

4. The combination of two horizontal filter-beds arranged one above the other and mounted to be rotated or partially rotated at will, water-pipes located at the top and bottom respectively of the two beds, a valve-casing attached to and rotatable with the filter-beds, chambers or ports with which said pipes respectively communicate, a cylindrical valve rotatable within such casing, a second casing applied at the outer end of the cylindrical valve, an unfiltered-water-supply pipe, a filtered-water-discharge pipe, and a waste-water pipe connected with the latter casing, and ports or passages in the cylindrical valve and in the respective casings whereby in one position of the valve the waste-pipe is closed, unfiltered water admitted to one side of the beds respectively, and filtered water from the opposite sides of the beds delivered to the filtered-water-discharge pipe; in a second position, ingress and egress of water cut off; and in a third position, the direction of circulation of the water through the beds reversed, water that has passed through the beds directed to the waste-pipe and the filtered-water-discharge pipe closed.

5. The combination of a box or casing mounted to be rotated or partially rotated at will, a filter-bed arranged therein, water-pipes located at the top and bottom of the filter-bed, an internally-tapered valve-casing attached to one end of and rotatable with the box, a correspondingly-tapered cylindrical valve seated within the casing and having appropriate ports and passages for directing the circulation of water through the filter-bed in either direction at will, and means applied at the opposite end of the filter box or casing for pressing the valve-casing into close contact with the valve.

6. The combination of a box or casing mounted to be rotated or partially rotated at will, a filter-bed arranged therein, water-pipes located at the top and bottom of the filter-bed, an internally-tapered valve-casing attached to one end of and rotatable with the box, a correspondingly-tapered cylindrical valve seated within the casing and having appropriate ports and passages for directing the circulation of water through the filter-bed in either direction at will, and a hydraulic cylinder applied at the opposite end of the filter box or casing to press the valve-casing and valve into close contact.

7. The combination of a box or casing having a horizontal partition dividing it into two substantially equal chambers, a transverse partition or partitions dividing each such chamber into compartments, each adapted to receive filtering material, screens located across the tops and bottoms of the compartments, water-pipes arranged outside of the screens at the tops and bottoms of the two series of compartments, a valve-casing having ports or chambers with which such pipes communicate, and a rotatable valve seated therein, the casing and valve having ports and passages whereby on the rotation of the valve, the direction of circulation of water through the filter-bed may be reversed.

8. The combination of a box or casing mounted to be rotated or partially rotated at will, and having a horizontal partition dividing it into two substantially equal chambers, a transverse partition or partitions dividing each such chamber into compartments, and each adapted to receive filtering material, screens located across the tops and bottoms of the compartments, water-pipes arranged outside of the screens at the tops and bottoms of the two series of compartments, a valve-casing having ports or chambers with which such pipes communicate, and a rotatable valve seated therein, the casing and valve having ports and passages whereby on the rotation of the valve the direction of circulation of water through the filter-bed may be reversed.

9. A reversible casing comprising two or more compartments formed by one or more vertical partitions, and each adapted to contain integral parts of a single horizontal filter-bed of granular material, and a series of transverse breakers or knives in each compartment adapted to break up or disintegrate the filter-bed when it is reversed.

10. A reversible box or casing containing two or more compartments formed by a vertical partition or partitions and adapted to receive integral parts of a single horizontal filter-bed of granular material, screens arranged at the tops and bottoms of the compartments, water-pipes arranged outside of the screens at the tops and bottoms of the compartments, valve mechanism with which such water-pipes are connected, an unfiltered-water-supply pipe, and a filtered-water-discharge pipe connected with the valve mechanism.

11. A reversible compartment to receive granular material forming a filter-bed and a series of breaking or cutting knives arranged horizontally across the compartment and adapted to break up or disintegrate the granular material forming the filter-bed when the compartment is reversed.

12. A reversible compartment adapted to receive granular material forming the filter-bed, having transverse bars B³ extending across it and a series of parallel breakers or cutting-knives extending horizontally across the compartment and supported by such bars.

13. A box or casing mounted to be rotated or partially rotated at will and having its interior divided into compartments by means of vertical partitions, bars B³ attached to the walls of each compartment and to posts B⁴ supported by the bars, whereby each compartment is divided into several subcompartments, series of breakers or cutting-knives supported by said bars and extending horizontally across the compartments, screens at the top and bottom of the series of compartments, water-pipes located outside of the screens, valve mechanism with which the water-pipes are connected and water supply and discharge pipes connected with the valve mechanism.

14. The combination of a horizontal filter-bed mounted to be rotated or partially rotated at will, water-pipes located at the top and bottom of the bed, a combined induction and eduction rotatable valve with which said pipes communicate, an unfiltered-water-supply pipe, a filtered-water-discharge pipe, and a waste-water pipe connected with the valve, and ports and passages in the valve, whereby in one position of the valve, water is circulated through the filter-bed in one direction and the waste-pipe closed; in a second position ingress and egress of water cut off; and in a third position, the direction of circulation of water through the filter-bed reversed, water from the bed directed to the waste-pipe, and the filtered-water-discharge pipe closed.

15. The combination of a filter-bed, water-pipes arranged at each side thereof, a combined induction and eduction rotatable valve mechanism with which such pipes are connected, an unfiltered-water-supply pipe, a filtered-water-discharge pipe and a waste-water pipe connected with the valve mechanism, whereby in one position of the valve, unfiltered water is admitted to one side of the filter-bed and filtered water from the opposite side delivered to the filtered-water-discharge pipe; and in another position, the filtered-water-discharge pipe is closed, circulation of water through the filter-bed reversed, and water from the filter-bed directed to the waste-pipe.

16. The combination of a horizontal filter-bed mounted to be rotated or partially rotated at will, water-pipes arranged at the top and bottom of the filter-bed, a valve-casing attached to and rotatable with the filter-bed, and having ports or passages with which said water-pipes connect, a valve seated in the casing, an unfiltered-water-supply pipe, a filtered-water-discharge pipe, and a waste-water pipe connected with the valve, and ports or passages, whereby in one position of the valve, unfiltered water is directed to one side of the filter-bed and filtered water from the opposite side of the bed delivered to the filtered-water-discharge pipe; and in another position, the direction of circulation of water through the filter-bed reversed, the filtered-water-discharge pipe closed and water from the filter-bed delivered to the waste-pipe.

17. The combination of a horizontal filter-bed mounted to be rotated or partially rotated at will, water-pipes arranged at the top and bottom of the filter-bed, a valve-casing attached to and rotatable with the filter-bed, and having ports or passages with which said water-pipes connect, a valve seated in the casing, an unfiltered-water-supply pipe, a filtered-water-dischare pipe, and a waste-water pipe connected with the valve and ports or passages, whereby in one position of the valve, unfiltered water is directed to one side of the filter-bed and filtered water from the opposite side of the bed delivered to the filtered-water-discharge pipe; in another position, the direction of circulation of water through the filter-bed reversed, the filtered-water-discharge pipe closed and water from the filter-bed delivered to the waste-pipe; and in a third position, ingress and egress of water cut off.

18. The combination with a filter-bed, of water-pipes at one side, water-pipes at the opposite side thereof, a valve-casing V having a chamber with which the first-named pipes connect and a chamber with which the second-named pipes connect, a port 7 in the former chamber, the valve having the segmental passage 4 with ports 5, 6, therein and the passage 3 connecting therewith, the segmental passage 2 at the outer end of the passage 3 having in it the ports 1 and 3'; a port 12 in the latter chamber, a segmental passage 14, in the valve, having a port 13 coöperating with the port 12, a passage 15 communicating with the segmental passage 14 and having at its outer end a port 16; the outer valve-casing V' having connected with it the pipe U in proper relation to the segmental passage 2, the pipe R in proper relation to the port 16, and the pipe S in a radial line intermediate the ports 5 and 13; and a pipe or passage 17 in the valve open to the port 18 at the outer end of the valve and the port 19 at the inner end of the valve, substantially as and for the purpose set forth.

19. The combination with a horizontal filter-bed mounted to be rotated or partially rotated at will, of water-pipes at one side of the bed, water-pipes at the opposite side thereof, a valve, a casing rotatable with the filter and having a chamber with which the first-named pipes communicate and a chamber with which the second-named pipes communicate, a port 7 in the former chamber, the valve having the segmental passage 4 with ports 5, 6, therein and the passage 3 connecting therewith, the segmental passage 2 at the outer end of the passage 3 having in it the ports 1 and 3', a port 12 in the latter chamber, a segmental passage 14 in the valve having a port 13 coöperating with the port 12, a passage 15 communicating with the segmental passage 14 and having at its outer end a port 16; the outer valve-casing V' having connected with it the pipe U in proper relation to the segmental passage 2, the pipe R in proper relation to the port 16, and the pipe S in a radial line intermediate the ports 5 and 13; and a pipe or passage 17 in the valve open to the port 18 at the outer end of the valve and the port 19 at the inner end of the valve, substantially as and for the purpose set forth.

20. The combination with two filter-beds of water-pipes $a$ $a'$ and $c$ $c'$ arranged respectively on corresponding sides of the beds, water-pipes $b$ $b'$ and $d$ $d'$ arranged respectively on opposite sides of the beds, a valve-casing V having a chamber with which the pipes $a$ $a'$ and $c$ $c'$ communicate and a chamber with which the pipes $b$ $b'$ and $d$ $d'$ communicate, a port 7 in the former chamber, the valve having the segmental passage 4 with ports 5, 6, therein and the passage 3 connecting therewith, the segmental passage 2 at the outer end of the passage 3 having in it the ports 1 and 3' a port 12 in the latter chamber, a segmental passage 14 in the valve having a port 13 coöperating with the port 12, a passage 15 communicating with the segmental passage 14 and having at its outer end a port 16; the outer valve-casing V' having connected with it the pipe U in proper relation to the segmental passage 2, the pipe R in proper relation to the port 16 and the pipe S in a radial line intermediate the ports 5 and 13; and a pipe or passage 17 in the valve open to the port 18 at the outer end of the valve and the port 19 at the inner end of the valve, substantially as and for the purpose set forth.

21. The combination with two horizontal filter-beds mounted to be rotated or partially rotated at will, of water-pipes $a$ $a'$ and $c$ $c'$ arranged respectively on corresponding sides of the beds, water-pipes $b$ $b'$ and $d$ $d'$ arranged respectively on opposite sides of the beds, a valve-casing V having a chamber with which the pipes $a$ $a'$ and $c$ $c'$ communicate and a chamber with which the pipes $b$ $b'$ and $d$ $d'$ communicate, a port 7 in the former chamber, the valve having the segmental passage 4 with ports 5 6, therein and the passage 3 connecting therewith, the segmental passage 2 at the outer end of the passage 3 having in it the ports 1 and 3' a port 12 in the latter chamber, a segmental passage 14 in the valve having a port 13 coöperating with the port 12, a passage 15 communicating with the segmental passage 14 and having at its outer end a port 16; the outer valve-casing V' having connected with it the pipe U in proper relation to the segmental passage 2, the pipe R in proper relation to the port 16 and the pipe S in a radial line intermediate the ports 5 and 13; and a pipe or passage 17 in the valve open to the port 18 at the outer end of the valve and the port 19 at the inner end of the valve, substantially as and for the purpose set forth.

22. A reversible filter-bed of finely-divided material combined with an independently rotatable or adjustable combined induction and eduction valve and appropriate water pipes or connections whereby water may be circulated through the bed in either direction, or ingress and egress of water cut off at will, and the filter-bed reversed at will, substantially as set forth.

23. A reversible filter-bed of finely-divided material combined with an independently-rotatable induction and eduction valve, appropriate pipe connections between the respective sides of the filter-bed and the valve, an unfiltered-water-supply pipe, a filtered-water-discharge pipe and a waste-water pipe connected with the valve, whereby the bed may be reversed at will, and in one position of the valve unfiltered water directed to one side of the filter-bed and from the other side delivered to the filtered-water-discharge pipe; in a second position, the direction of circulation of water through the filter-bed reversed, the water therefrom directed to the waste-pipe and the filtered-water-discharge pipe closed; and in a third position ingress and egress of water cut off, substantially as set forth.

24. The combination with the filter-bed compartment of the screen-frame having one or more openings therein, flanges for attachment to the walls of the compartment and a strengthening-rib, screens applied at the openings and means for detachably clamping them in place.

25. The combination of a filter, water pipes or connections, and an induction and eduction valve having three sets or groups of ports and passages so arranged and connected that in the normal position water is admitted to the bed through one set of ports and passages and from the bed discharged through another set, and in another position the circulation of water reversed, the water being admitted through a third set of ports and passages and part of the second-named set, and discharged through the first-named set.

26. The combination with a filter-bed, of pipe connections, and valve mechanism with ports or passages adapted on the manipulation of the valve to reverse the circulation of water to clean the bed, and also ports or passages so constructed and arranged that on such reversal no part of the water from the bed traverses any part of the pure-filtered-water-discharge passages.

Signed at New York city, in the county of New York and State of New York, this 30th day of April, A. D. 1900.

ROBERT T. WEAVER.

Witnesses:
WM. O'SHAUGHNESSY,
JOHN R. FREER.